B. GARROS.
THERMO CONTROLLING DEVICE FOR MOVING PICTURE MACHINES.
APPLICATION FILED OCT. 26, 1914.
1,178,914.
Patented Apr. 11, 1916.
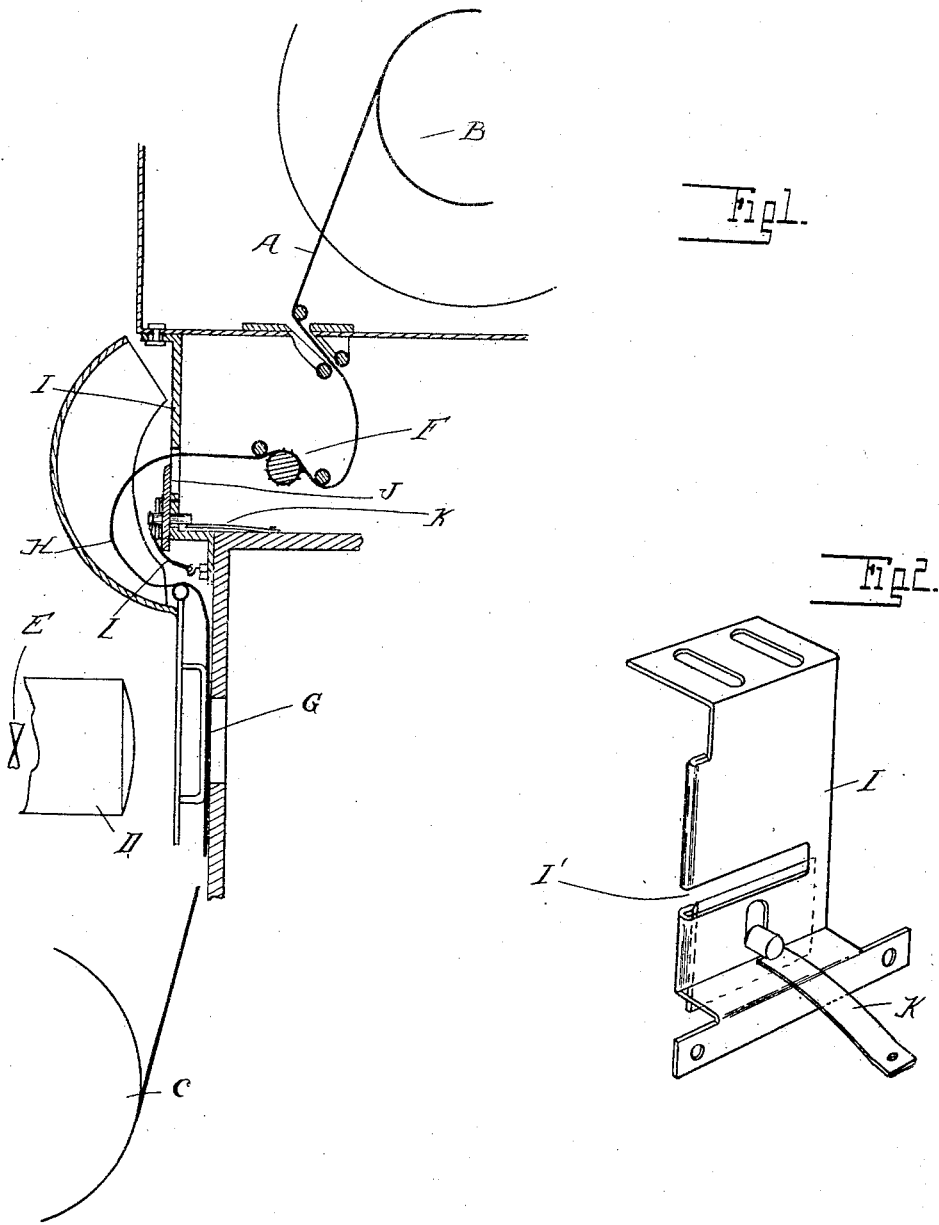
WITNESSES:
W. K. Ford
James P. Barry
INVENTOR
Benjamin Garros
BY
Whittemore Hulbert & Whittemore
ATTORNEYS

UNITED STATES PATENT OFFICE.

BENJAMIN GARROS, OF DETROIT, MICHIGAN, ASSIGNOR OF TWENTY-FIVE ONE-HUNDREDTHS TO CHARLES E. ALLINGER, TWENTY-FIVE ONE-HUNDREDTHS TO CHARLES A. STRELINGER, TWENTY-FIVE ONE-HUNDREDTHS TO CHARLES T. BUSH, AND TWENTY-FIVE ONE-HUNDREDTHS TO MAJOR E. JONES, ALL OF DETROIT, MICHIGAN.

THERMO-CONTROLLING DEVICE FOR MOVING-PICTURE MACHINES.

1,178,914. Specification of Letters Patent. Patented Apr. 11, 1916.

Application filed October 26, 1914. Serial No. 868,683.

*To all whom it may concern:*

Be it known that I, BENJAMIN GARROS, a citizen of the United States of America, residing at Detroit, in the county of Wayne and State of Michigan, have invented certain new and useful Improvements in Thermo-Controlling Devices for Moving-Picture Machines, of which the following is a specification, reference being had therein to the accompanying drawings.

The invention relates to moving picture machines of the type employing an inflammable picture film, and it is the object of the invention to provide automatic means for preventing the spread of fire along the film in case the latter becomes ignited.

In the drawings: Figure 1 is a diagrammatic view showing a moving picture machine with my improvement applied thereto; and Fig. 2 is a perspective view of the shutter.

A is the traveling film; B the upper reel and C the lower reel; D is the lens or projector; and E is the light which is concentrated upon the film adjacent to the lens.

The ignition of the film is generally caused by the concentrated light, particularly where the film is not actuated at full velocity. Thus where there is little danger of ignition in the normal operation of a power-driven machine, with a hand-actuated machine the speed of the film may at times be reduced to the danger point.

My improvement is designed to automatically check the spread of fire where the film becomes ignited, and as shown is of the following construction.

F is a driving roll over which the film travels; G is a guideway through which the portion of the film subjected to the concentrated light passes; H is a loop in the film intermediate the portion engaging the roll F and the portion in the guideway G; I is a slotted fire-proof partition between the portion of film engaging the roll F and the loop H; J is a sliding shutter for closing the slot I' in the partition I; K is a spring for actuating the shutter to close the same; and L is a link of fusible or combustible material for holding the shutter in its open position against the tension of the spring K. This link L is arranged as shown in Fig. 1, where it extends above a portion of the loop H and substantially parallel thereto. It is also in close proximity to this portion of the film, and the arrangement is such that when the portion of film in the guideway G is ignited by the concentrated light rays, the ascending flame will impinge against the link and sever the same. This will permit the spring K to close the shutter J before the fire has time to travel the loop H and through the slot I. Thus only a small portion of the film will be destroyed, for the flame will not travel downward on the film, and the portion of the film on the upper roll and in engagement with the drive mechanism will be protected by the shutter.

What I claim as my invention is:—

1. The combination with a traveling inflammable film having a drive mechanism and a guide for a portion subjected to the light, with a loop in the film intermediate same, of a slotted fire-proof partition intermediate said drive mechanism and loop, a shutter for automatically closing the slot in said partition, and a thermally-releasable link for restraining said shutter lying adjacent to the portion of said loop nearest said light.

2. The combination with a traveling inflammable film having a portion engageable with the drive mechanism, a portion in proximity to the source of light and an intermediate loop portion, of a slotted partition intermediate the drive mechanism and loop through which said film passes, a shutter for closing the slot, a spring for actuating said shutter, and a fusible link engaging said shutter to restrain the same, extending parallel to the lower portion of said loop and in the direct path of flame when said film is ignited.

3. The combination with a traveling inflammable film having a substantially horizontally extending portion, a substantially vertically extending portion in proximity to the source of light, and an intermediate loop portion, of a slotted fire-proof partition between said substantially horizontally extending portion and loop portion, a shutter for automatically closing the slot in said partition, and a thermally-releasable link for restraining said shutter positioned in alinement with said substantially vertically extending portion of the film and in close proximity to the lower portions of the loop portion.

In testimony whereof I affix my signature in presence of two witnesses.

BENJAMIN GARROS.

Witnesses:
 JAMES P. BARRY,
 HENRI E. BOWMAN.